(12) United States Patent
Fretz et al.

(10) Patent No.: US 12,019,629 B2
(45) Date of Patent: Jun. 25, 2024

(54) HASH-BASED DATA STRUCTURE

(71) Applicant: Target Brands, Inc., Minneapolis, MN (US)

(72) Inventors: Christopher Fretz, Harleysville, PA (US); Hrishikesh V. Prabhune, Sunnyvale, CA (US); Luis F. Stevens, San Jose, CA (US)

(73) Assignee: Target Brands, Inc., Minneapolis, MN (US)

( * ) Notice: Subject to any disclaimer, the term of this patent is extended or adjusted under 35 U.S.C. 154(b) by 50 days.

(21) Appl. No.: 17/741,910

(22) Filed: May 11, 2022

(65) Prior Publication Data

US 2022/0269675 A1 Aug. 25, 2022

Related U.S. Application Data

(62) Division of application No. 16/593,636, filed on Oct. 4, 2019, now Pat. No. 11,366,807.

(51) Int. Cl.
| | |
|---|---|
| *G06F 7/00* | (2006.01) |
| *G06F 16/22* | (2019.01) |
| *G06F 16/242* | (2019.01) |
| *G06F 16/2455* | (2019.01) |
| *G06F 16/2457* | (2019.01) |

(52) U.S. Cl.
CPC ...... *G06F 16/2445* (2019.01); *G06F 16/2237* (2019.01); *G06F 16/2255* (2019.01); *G06F 16/24553* (2019.01); *G06F 16/24573* (2019.01)

(58) Field of Classification Search
CPC .......... G06F 16/2445; G06F 16/24573; G06F 16/2237; G06F 16/24553; G06F 16/2255

USPC ......... 707/736, 745, 747, 769, 770, 999.001
See application file for complete search history.

(56) References Cited

U.S. PATENT DOCUMENTS

| | | | |
|---|---|---|---|
| 6,988,180 B2 | 1/2006 | Kadatch | |
| 8,209,549 B1 * | 6/2012 | Bain, III | ............. G06Q 20/382 |
| | | | 705/64 |
| 8,301,654 B2 | 10/2012 | Kodama | |
| 8,874,842 B1 | 10/2014 | Kimmel | |
| 9,047,329 B1 | 6/2015 | Tyson | |
| 9,229,869 B1 | 1/2016 | Parakh | |
| 10,303,383 B1 | 5/2019 | Karr | |
| 10,528,280 B1 * | 1/2020 | Sandvig | ............... G06F 3/0608 |
| 2004/0083347 A1 | 4/2004 | Parson | |
| 2010/0185703 A1 | 7/2010 | Ylonen | |

(Continued)

OTHER PUBLICATIONS

Anonymous, "Data Structures and Algorithms Hash Table," Tutorialspoint [online]. Retrieved from the Internet: <URL: https://www.tutorialspoint.com/data_structures_algorithms/hash_data_structure.htm>, 8 pgs., retrieved on Jun. 24, 2019.

(Continued)

*Primary Examiner* — Md I Uddin
(74) *Attorney, Agent, or Firm* — Merchant & Gould P.C.

(57) ABSTRACT

Examples disclosed herein are relevant to configurations of hash tables. An example hash table includes is configured to be placed into a contiguous block of shared memory and be used across multiple processes. The hash table can include a memory layout having two logical tables: a metadata table and a storage array. In addition, a storage bitmap can be used to determine available memory locations in the storage array. Disclosed configurations can be suited for use in high-performance computing applications.

10 Claims, 7 Drawing Sheets

(56) References Cited

U.S. PATENT DOCUMENTS

| | | |
|---|---|---|
| 2014/0214855 A1 | 7/2014 | Attaluri |
| 2017/0255709 A1 | 9/2017 | Cho et al. |
| 2020/0034440 A1 | 1/2020 | Schneider et al. |

OTHER PUBLICATIONS

Anonymous, "In-Stream Big Data Processing," Highly Scalable Blog [online]. Retrieved from the Internet: <URL: https://highlyscalable.wordpress.com/2013/08/20/in-stream-big-data-processing/>, 19 pgs., published Aug. 20, 2013.

Anonymous, "Modulo operation," Wikipedia [online]. Retrieved from the Internet: <https://en.wikipedia.org/w/index.php?title=Modulo_operation&oldid=901366118>, 7 pgs. Published Jun. 11, 2019.

Black, "hash table," NIST National Institute of Standards and Technology [online]. Retrieved from the Internet: <URL: https://xlinux.nist.gov/dads/HTML/hashtab.html>, published Feb. 12, 2019, 2 pages.

Michael, "High performance dynamic lock-free hash tables and list-based sets." Proceedings of the fourteenth annual ACM symposium on Parallel algorithms and architectures. ACM, pp. 73-82, published Aug. 10, 2002.

Anonymous, "An advanced hash table supporting configurable garbage collection semantics of keys and values: Hash Code <<Development Class<< Java." Java [online]. Retrieved from the Internet: <URL: http://www.java2s.com/Code/Java/Development-Class/Anadvancedhashtablesupportingconfigurablegarbagecollectionsemanticsofkeysandvalues.htm>, 25 pages, Apr. 25, 2019.

Purcell et al., "Non-blocking hashtables with open addressing," University of Cambridge Computer Laboratory, Technical Report No. 639, 23 pages, Sep. 2005.

Shahriyar et al., "Down for the count? Getting reference counting back in the ring," International Symposium on Memory Management in Beijing, China, 11 pgs, Jun. 15, 2012.

\* cited by examiner

HASH-BASED DATA STRUCTURE

RELATED APPLICATIONS

This application is a divisional of U.S. patent application Ser. No. 16/593,636, filed Oct. 4, 2019 which is incorporated by reference herein in its entirety.

BACKGROUND

Hash-based data structures include hash tables and hash maps, which associate keys and values with a location of value in the data structure being determined based on a hash of the key using a hash function. A hash function is a function that maps input data to output data, typically mapping arbitrarily sized input data to fixed size output data.

SUMMARY

In an example, there is a system comprising: one or more processors; and a non-transitory computer-readable medium comprising instructions that, when executed by one or more processors, cause the one or more processors to perform a method. The method including: maintaining in shared memory a data structure comprising: a storage array; a storage bitmap encoding memory availability information for the storage array; and a metadata table for storing mapping entries. The method further includes receiving and storing a value in the storage array based on an associated key using the storage bitmap and the metadata table; and looking up and returning a value stored in the storage array based on an associated key using the storage bitmap and the metadata table.

In an example, the mapping entries comprise a first mapping entry that maps from a hashed key to an occupied index in the storage array storing a value associated with the hashed key. The mapping entries can comprise a second mapping entry that maps from a hashed key to tombstone value. Maintaining in shared memory can include contiguously maintaining the storage array, storage bitmap, and metadata table in shared memory. The storage array can have has a fixed size. The storage bitmap can have a fixed size. The metadata table can have a fixed size.

In an example, there is a method including: receiving a key and a value; hashing the key to obtain a hashed key; mapping the hashed key to a start location; locating an unoccupied location in a storage array based on the start location and using a storage bitmap; adding the value to a slot of the storage array corresponding to the unoccupied location; and adding the hashed key and the unoccupied location to a mapping entry in a metadata table.

The hashed key can be a number. Mapping the hashed key to a start location can include performing h modulo n, where h is the hashed key and n is a number of slots in the storage array. Locating the unoccupied location can include determining whether a bit of the storage bitmap corresponding to the start location indicates that a slot of the storage array at the start location in the storage array is available. Locating the unoccupied location can include performing linear probing of bits in the storage bitmap starting at the start location. The method can further include storing the storage bitmap, metadata table, and the storage array contiguous with each other in memory. The method can further include receiving a second key; hashing the second key to obtain a second hashed key; mapping the second hashed key to a start location; locating a second mapping entry in the metadata table corresponding to the second key; and returning a second value stored in the storage array in a location specified in the mapping entry.

In an example, there is a non-transitory computer-readable medium comprising: hash table instructions comprising: initialization instructions that, when executed, cause one or more processors to perform an initialization process for initializing a lock-free hash table having a storage bitmap, a metadata table, and a storage array; insert instructions that, when executed, cause one or more processors to perform an insert process for inserting a key-value pair into the lock-free hash table; and lookup instructions that, when executed, cause one or more processors to perform a lookup operation for returning a value corresponding to a given key from the lock-free hash table.

The initialization process can include contiguously creating the storage bitmap, the metadata table, and the storage array as fixed-size memory regions in memory. In an example, the insert process does not call an operating-system-level memory function. In a further example, the insert process does not call a memory manager function of one provided by the hash table instructions. The insert process can include an operation that uses the storage bitmap to identify available slots in the storage array of the hash table. The insert process can identify available memory in the storage array of the hash table using linear probing with respect to a starting location determined based on the hashed value. The insert process can identify available memory in the storage array of the hash table using linear probing with respect to a start location determined based on a hashed value. The insert process can include using linear probing to identify available memory locations in the storage array of the hash table. The insert process can use linear probing to resolve hash collisions. The insert process can be lock free with respect to the hash table.

BRIEF DESCRIPTION OF THE DRAWINGS

The same number represents the same element or same type of element in all drawings.

DETAILED DESCRIPTION

Figure 1:
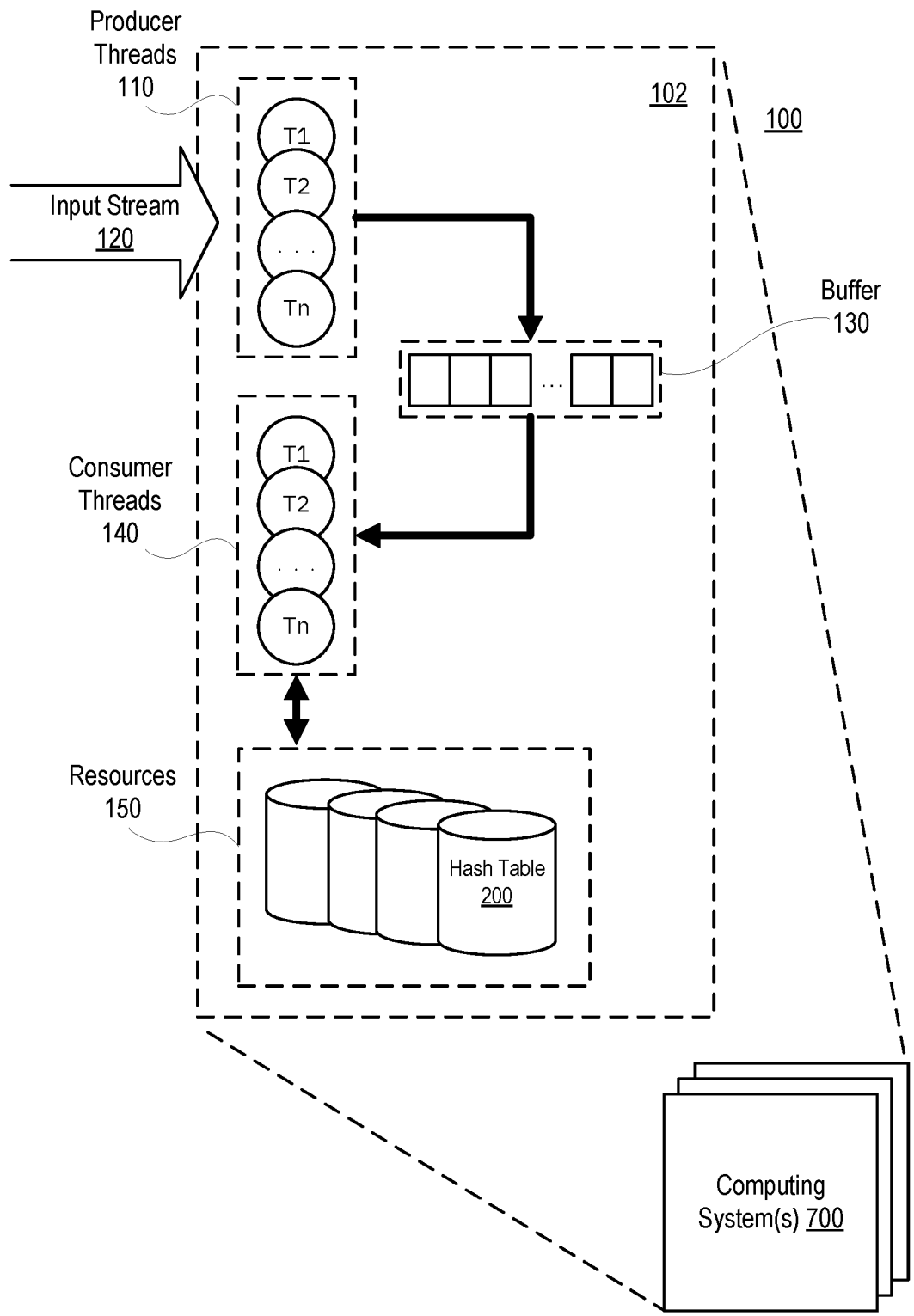
FIG. 1 illustrates an example computing environment that can benefit from use of technologies described herein.

This disclosure describes hash-based data structures. The data structures disclosed herein can have several advantages over prior techniques. For example, data structures herein can be configured to be placed into shared memory and be used across multiple processes, which confers a large processing speed increase. In an example implementation, the data structure includes at least two logical tables: a metadata table and a storage array. In addition, a storage bitmap is used to allocate locations in memory. A bitmap offset based on a hashing function is used to increase the speed at which available locations are able to be located. The storage bitmap allows allocations of locations at an arbitrary bit level within the storage bitmap. Further, the availability of locations in the storage bitmap can be probed based on a hash function associated with the data structure, which creates significant speedups over traditional techniques. For ease of understanding by the reader, many examples herein will refer to the data structure as a "hash table", but a person of skill in the art will understand in view of this disclosure that the technology described herein can be applied to many other kinds of data structures and that the technology need not be limited to hash tables.

As described above, an example implementation of a hash table can have three primary components: a metadata table, a storage array, and a storage bitmap. The metadata table can hold mapping information that describes associations between hashes of keys and an associated location in the storage array that stores values. Advantageously, the metadata table can facilitate the atomic swapping of arbitrarily sized values, which is traditionally not possible in hash tables. The storage bitmap can be used for thread-safe lock-free allocation of locations within the storage array and supports allocation at arbitrary bit-precision.

Continuing the example implementation, insertion and removal operations can be performed on a hash table by a processing thread. The thread hashes a key according to a hash policy of the hash table, thereby generating a 64-bit integer. The thread maps the 64-bit integer into the metadata table using, for example, a modulo operation or bit masking. To insert the value, the thread locates a storage slot for the value in the storage array using the mapped hashed key as a starting location for probing in the storage bitmap. The thread performs linear probing within the storage bitmap until an available location is found. The thread updates the storage bitmap to indicate that the found location is full or empty based on whether insertion or removal is being performed. The thread then copies or moves the value into the storage array at the available location. Then the thread indexes into the metadata table, using the mapped hashed key, and begins probing for a slot belonging to, or available for, the hashed key. If the thread finds that the location determined using the mapped hashed key is unoccupied, the thread then attempts to swap the hashed value into the unoccupied location and then attempts to swap the storage index corresponding to the stored value into the metadata table (if the operation is a removal operation, then a tombstone value representing a logical absence of a value is swapped in instead of the value). If the thread finds that the hash is already present in the metadata table, then the thread attempts (until it succeeds) to swap the storage index into the metadata table, thereby finishing the insertion (again, if this is a removal operation, the storage index used is a tombstone value representing a logical absence of a value). If the thread traverses the entire table without locating its slot or an unoccupied slot, then, if inserting, the thread deallocates the value from the storage array and returns failure to the code that requested insertion. If removing, thread returns success to the code requesting deletion. A garbage collection process can be used to reclaim memory that is no longer being used as a result of insertion, removal, or other operations.

Continuing the example implementation, a lookup operation can be performed on a hash table by a lookup thread. The lookup thread hashes a key according to a hash policy of the hash table, thereby generating a 64-bit integer. The lookup thread maps the integer into the table, such as by using a modulo operation or bit masking. The lookup thread indexes into the metadata table using the mapped hashed key and begins probing for a location belonging to the hashed key. If the lookup thread finds an empty slot in the metadata table at that location, then the key is not present in the table and the lookup thread returns failure to the code requesting lookup. If the lookup thread finds the hashed key present in some location of the metadata table, then the storage index associated with that location is analyzed. If the storage index associated with the location is a tombstone value, the thread returns failure to the code requesting lookup. If the storage index is not a tombstone value, then the thread uses the storage index to locate the value associated with the hashed key in the storage array. The thread then returns the located value to the code requesting lookup. But if the lookup thread traverses the entire metadata table without locating a slot associated with the hashed value or an unoccupied slot, then the key is not present in the table and the lookup thread returns failure to the code requesting lookup.

The example implementation can further use a garbage collection process that removes no-longer referenced data from the storage array. In examples, the hash table can implement intrusive reference counting, where a reference counter is contiguous with the data. Advantageously, the contiguous nature can mean that when a thread obtains the counter, the associated data is also loaded. The garbage collection process can remove unneeded values from the storage array and update the metadata table and storage bitmap accordingly.

The example implementation of the hash table can be implemented as a thread-safe and lock-free hash table. The components of the hash table can be contiguously allocated in shared memory, so the hash table can be accessed by multiple processes simultaneously, thereby providing a benefit over traditional techniques. In addition, the use of linear probing in contiguous memory can make the probing significantly faster because the one or more processors executing the thread is more efficiently able to prefetch the data. Additional benefits will be understood by those in the art. Additional implementations and examples can be understood with reference to the following disclosure and associated figures.

Example Environment

FIG. 1 illustrates an example computing environment 100 that can benefit from use of technologies described herein. The computing environment 100 is provided by one or more computing systems 700 (described in more detail in FIG. 7). In many examples, the one or more computing system 700 are each one more physical or virtual computers having memory and one or more processors configured to execute instructions stored in the memory. The one or more computing systems 700 can be configured for particular tasks. In an example, the computing systems 700 can be high-performance computing systems having special-purpose hardware. The special-purpose hardware can include server- or workstation-grade CPUs (Central Processing Units) supporting high core counts, supporting large amounts of system memory, having large caches, having error correcting capabilities, other features, or combinations thereof. The special purpose hardware can include GPUs (Graphics Processing Units), AI (Artificial Intelligence) accelerating hardware (e.g., AI-focused processors or co-processors), error-correcting memory, other hardware, or combinations thereof. Further, one or more features can be provided as physical or virtual machines.

The computing environment 100 includes a producer-consumer workflow 102 having one or more producer threads 110 running on the one or more computing systems 700 (e.g., in parallel). The producer threads 110 each produce data to a buffer 130 for consumption by one or more consumer threads 140. In the illustrated example, the producer threads 110 produce data based, in part, on an input stream 120. The consumer threads 140 run on the one or more computing systems (e.g., in parallel), remove data from the buffer 130, and process the data to produce a result. During this process, one more resources 150 can be used by the consumer threads 140. The one or more resources 150 can include one or more databases, data structures, or other resources. The resources 150 may, but need not, be provided by the one or more computing systems 700 (e.g., one or more of the resources can be provided by a remote server or other computer). As illustrated, one of the resources 150 is a hash table 200 (described in more detail herein). The hash table 200 can be used to, for example, accumulate state among the consumer threads 140.

Increases in the amount of data in the input stream 120, increases in the complexity of processing required by the consumer threads 140, and the demands by people or systems relying on the producer-consumer workflow 102, can likewise increase the importance of ensuring high performance of the system. While computing resources provided by the computing system 700 can be scaled up or down from a pool of available computing resources (e.g., processing speed, memory, cache space, energy efficiency), the computing resources are finite, thus improvements to how the data structures and other aspects are processed can yield improvements to the functioning of the one or more computing systems 700.

Techniques that may be common in traditional computing operations (e.g., blocking processing to wait for other programs to finish a task or otherwise synchronize processing) are often unsuitable in operating in such High-Performance Computing (HPC) applications. In addition, HPC systems often use many computing threads running on multiple different processors. As the number of threads increases, so too do difficulties in synchronizing processing and maximizing the use of resources. These difficulties are explained, in part, by what is known in the art as "Amdahl's Law", which predicts that theoretical speedups of parallel processing are limited by the ability of the underlying processes to be parallelized. Improvements to HPC technologies can generally relate to improving the ability of processes to be parallelized and run in HPC settings.

Various kinds of hash-based data structures are commonly used in programming contexts. But traditional implementations of hash-based data structures are not suited for use in HPC applications. This is often because traditional hash table implementations (e.g., as found in open source libraries) are designed for general applications rather than the special use cases found in HPC applications. For example, traditional implementations of hash tables create difficulties in synchronizing among multiple threads accessing a single hash table. Traditional solutions to this synchronization problem include locking individual slots in the hash table or the entire hash table itself. But these solutions to synchronization introduce new issues in the context of HPC applications. In particular, locking some or all of the hash table can create significant performance degradation, especially as additional threads are added. Further, traditional hash table implementations can respond to hash collisions using linked-list based chaining at the location of the collision. Although linked-lists are flexible, the traditional manner of allocating linked lists in memory can result in the use of scattered memory locations, which reduces the performance benefits from prefetching.

Hashed-based data structures disclosed herein can overcome one or more challenges in traditional hash-based data structures and be more suited for use in HPC applications.

Hash Table

Figure 2:
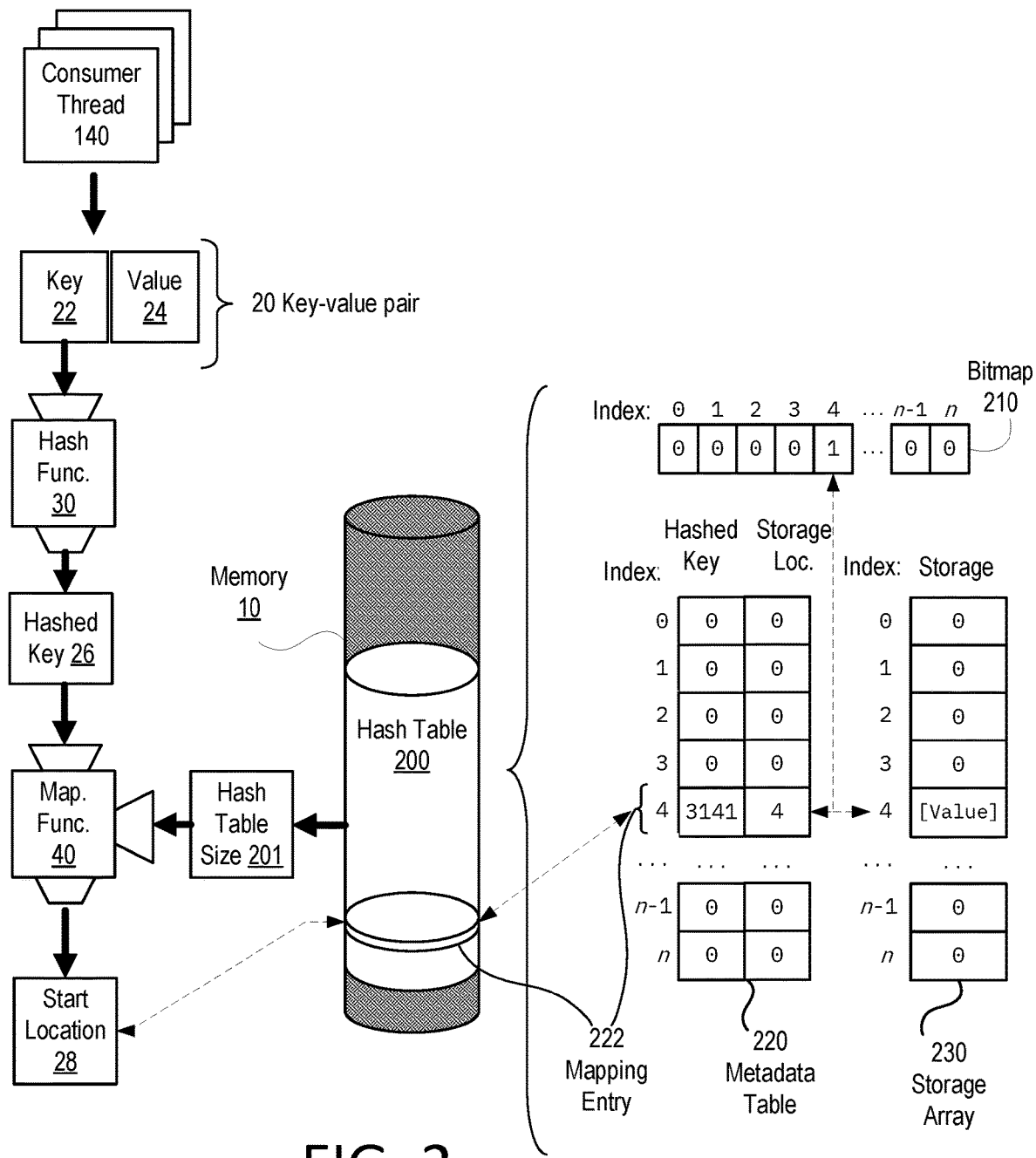
FIG. 2 illustrates a hash table and an associated processes for inserting a value into the hash table.

FIG. 2 illustrates a hash table 200 and associated processes for adding values into the hash table 200. As illustrated, the hash table 200 can be stored in a contiguous block of memory within memory 10. The figure illustrates one or more consumer threads 140 providing a key-value pair 20 that includes a key 22 and a value 24 that is being inserted into the hash table 200. The key 22 is hashed using a hash function 30 to produce a hashed key 26. The hashed key 26 is then provided as input into a mapping function 40 that produces a start location 28 in a hash table 200 based on the hashed key 26 and a hash table size 201. The value 24 is then stored in the hash table 200 based on the start location 28.

The memory 10 is electronic storage for a computing device. The memory 10 can be a main memory for a computer. In examples, the memory 10 can be a temporary, addressable storage for holding running programs and associated data for loading into cache memory (e.g., L2 or L1 cache) or processor registers for processing, as opposed to long-term general memory storage for a system. The memory 10 can be virtual or physical memory. The memory 10 can be or include shared memory that is accessible to all processors of a system. Locations in the memory 10 can be assigned by a memory manager, such as one of an operating system.

The key-value pair 20 can be an association between a key 22 and a value 24. The key 22 can be data serving as an identifier associated with the value 24. The value 24 can be a piece of data associated with the key 22. In some examples, the key-value pair 20 is a data structure storing the key 22 and the value 24. In other examples, the key-value pair 20 can be a logical grouping of the key 22 and the value 24.

The hash function 30 is a function that maps input data to output data. Typically, the hash function 30 maps arbitrarily sized input data to fixed size output data that is associated with the hash table 200. The output can be an integer. Any of a variety of hash functions 30 can be used. In an example, the hash function 30 is XXHASH. The hash function 30 need not be a cryptographic hash function, but a cryptographic hash function could be used. A hash function 30 can be selected based on relative speed and hash-collision rate. Generally, hash functions 30 having high speed and low hash-collision rates are desirable for use in high-performance applications.

The hashed key 26 is the resulting output from the hash function 30 that is produced when the key 22 is provided as input and hashed by the hash function 30.

The mapping function 40 is a function that maps the hashed key 26 to a start location 28 in the hash table 200. The mapping can be achieved by converting the hashed key 26 into a valid location in the hash table 200 based on the hash table size 201. For instance, the hashed key 26 may be the number 371,828 and the hash table 200 may have a hash table size 201 of only 1024 slots. The mapping function 40 can convert the number 371,828 into a valid slot in the hash table 200 (e.g., into a number in the range 0 to 1023, where the hash table 200 is indexed from zero). In an example, the mapping function 40 operates by performing h modulo n, where h is the hashed key 26 in integer form and n is the number of slots in a hash table in integer form. Because modulo operations are often performed using division, they can be rather slow. In examples where n is a power of two, the mapping can performed more quickly by using the equation h & (n−1), where "&" is the bitwise AND operation, h is the hashed key 26 in integer form, and n is the number of slots in a hash table in integer form.

The start location 28 can be the location in the hash table 200 at which the value 24 will be attempted to be inserted first. However, due to a variety of reason (e.g., hash collisions), the start location 28 is not necessarily the location in the hash table 200 where the value 24 will end up. Instead, the start location 28 serves as the location where the search for a location in the hash table 200 begins. In the illustrated arrangement, the start location 28 is the output of the mapping function 40, when the hashed key 26 is provided as input.

The hash table 200 is a data structure that associates keys 22 and values 24, with a location of value 24 in the data structure being determined based on a hash of the key 22 using the hash function 30. The hash table 200 itself includes a storage bitmap 210, a metadata table 220, and a storage array 230.

The storage bitmap 210 is a set of bits where each bit encodes storage information regarding the storage array 230. For instance, where the hash table size 201 is sixty-four, the storage array 230 would have sixty-four slots in which values 24 can be stored, so a storage bitmap 210 for the storage array 230 can be represented as a sixty-four-bit integer. In an example, a bit value of zero represents that the given slot is not being used to store a value 24 and a bit value of one represents that the given slot is being used to store a value 24. The use of a bitmap for encoding storage information can be beneficial because bitwise operations are often fast to perform in a processor. The storage bitmap 210 can have a constant size.

Traditionally, representations of storage allocation are not needed in hash table implementations because memory for storage by the hash table would be obtained from a global memory allocator (e.g., using the function "malloc" in C). But using such memory allocation can be slow and cause the allocation of discontinuous chunks of memory, which can cause performance issues. Here, the storage bitmap 210 acts as a memory manager for the hash table 200. For instance, when initialized, the hash table 200 can be put in a contiguous block of fixed-size memory in the memory 10. After allocation, functions associated with the hash table 200 can use the storage bitmap 210 to provide exclusive access to a chunk of memory to a requesting thread. The actual construction operation for copying data into the storage operation is not atomic, but the storage bitmap 210 can be modified in an atomic operation, thereby allowing for guarantees to be made to accessing threads that if the thread successfully obtains a slot from the bitmap, then it is the only thread to have that spot in the storage array 230.

The metadata table 220 is a data structure storing mapping entries 222. Each mapping entry is an association between a hashed key 26 and a storage location, which is a location in the storage array. The storage location can be specified in any of a number of ways, such as the index of the storage array 230 where the value 24 corresponding to the hashed key 26 is stored. In other examples, the storage location can be specified as an offset into the storage array 230. The metadata table 220 can be configured to have a fixed size. The metadata table 220 can be implemented in any of a variety of ways. In an example, the metadata table 220 is implemented as an array, such as a circular array.

The storage array 230 is the portion of the hash table 200 where the values are stored. The storage array 230 can be divided into a number of slots. The number of slots corresponds to the hash table size 201. The slots of the storage array 230 can be contiguously allocated. Advantageously, the storage array 230 can allow the values to be stored contiguously in shared memory, which provides for faster operations.

Figure 3:
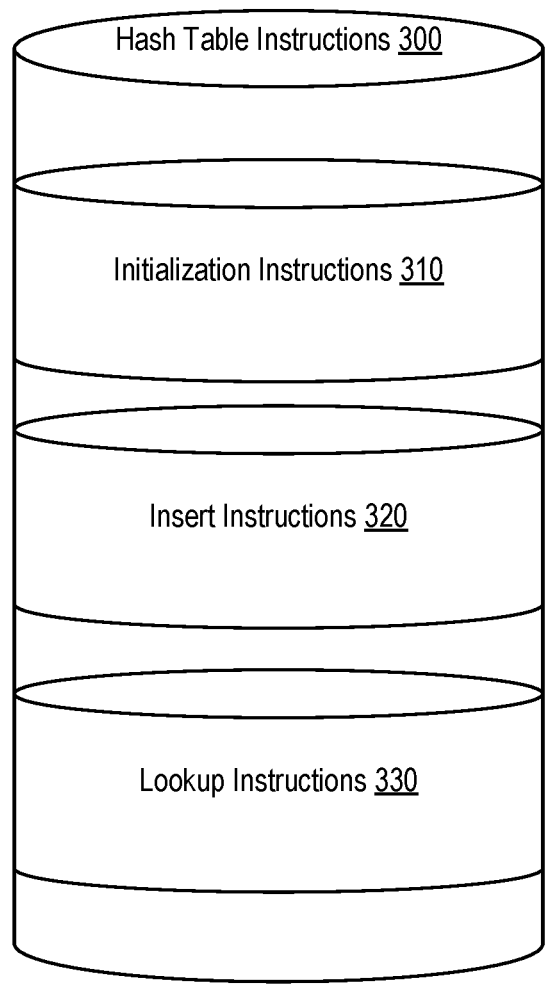
FIG. 3 illustrates hash table instructions.

The hash table 200 can be initialized and interacted with according to hash table instructions 300, which are described in relation to FIG. 3.

Hash Table Instructions

FIG. 3 illustrates hash table instructions 300. The hash table instructions 300 can be stored in memory for execution by one or more processors. As illustrated, the hash table instructions 300 can include initialization instructions 310, insert instructions 320, and lookup instructions 330. The initialization instructions 310 are instructions that, when executed by one or more processors, cause the one or more processors to perform an initialization process for initializing the hash table 200. The insert instructions 320 are instructions that, when executed by one or more processors, cause the one or more processors to perform an insert process for inserting a key-value pair into the hash table 200. The lookup instructions 330 are instructions that, when executed by one or more processors, cause the one or more processors to perform a lookup process for returning a value corresponding to a given key from the lock-free hash table. The hash table instructions 300 can be stored on a non-transitory computer-readable medium.

The initialization instructions 310 and initialization process are described in more detail in relation to FIG. 3. The insert instructions 320 and insert process are described in more detail in relation to FIG. 4. The lookup instructions 330 and lookup process are described in more detail in relation to FIG. 5.

Initialization Instructions

Figure 4:
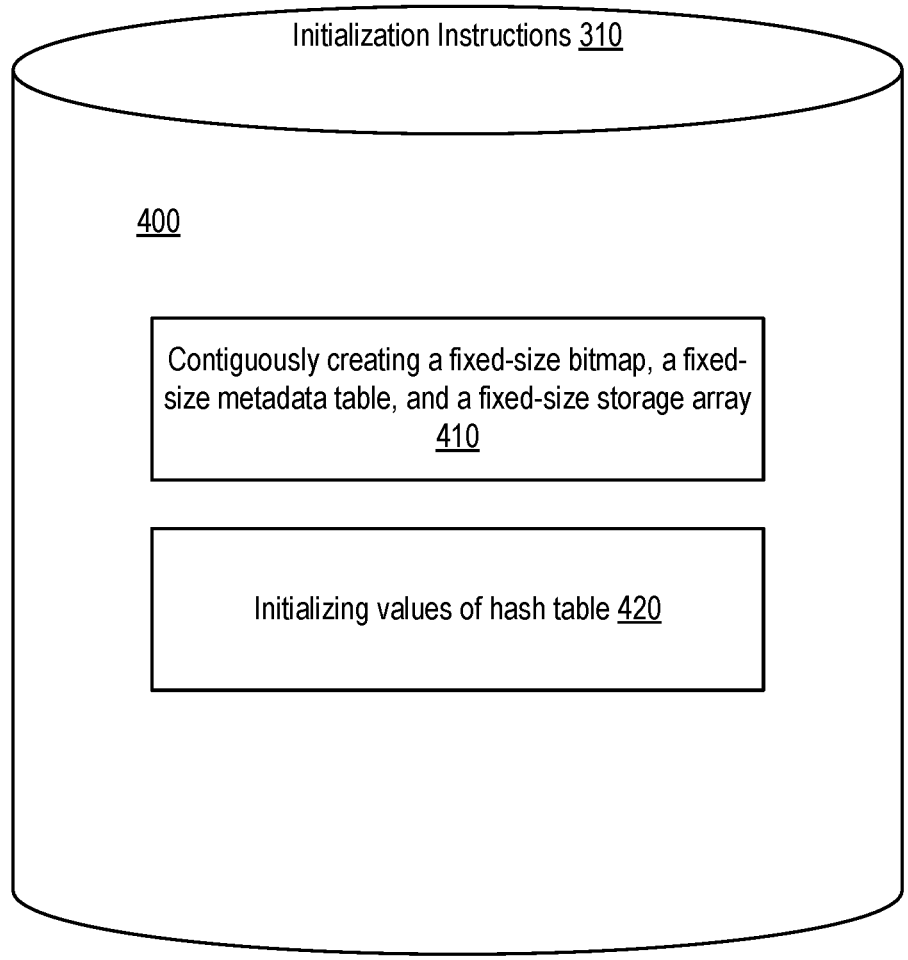
FIG. 4 illustrates initialization instructions and initialization operations.

FIG. 4 illustrates initialization instructions 310 and an initialization process 400. The process 400 can be used to initially create the hash table 200. For example, a running program can run the initialization process 400 to create an instance of the hash table 200. The process 400 can include operation 410 and operation 420.

Operation 410 includes creating the storage bitmap 210, the metadata table 220, and the storage array 230. This operation 410 can include obtaining a contiguous block of the memory 10 from a system memory manager. The contiguous block can be a fixed-size portion of the memory 10. The creating can be based on a given desired size for the hash table 200, the hash table size 201. The hash table size 201 can specify then number of storage slots to be created in the storage array 230. The hash table size 201 can also be the size of the metadata table 220 (e.g., the number of mapping entries 222 can be equal to the hash table size 201). The hash table size 201 can further be the number of bits of the storage bitmap 210. So based on the give hash table size 201, the size of the contiguous block of the memory 10 needed to store the hash table 200 can be determined. The hash table size 201 can be fixed, so the size of the storage bitmap 210, the metadata table 220, and the storage array 230 can all be fixed and predetermined (e.g., determined from the given hash table size 201 during the initialization). The operation 410 can include contiguously creating a fixed-size bitmap, a fixed-size metadata table, and a fixed-size storage array in the memory 10.

Operation 420 includes initializing values of the hash table 200. In an example, when the hash table 200 is created initially, the memory allocated to the hash table 200 can be zeroed out and tombstone values can be written into each of the location values in the metadata table 220. Tombstone values are special values that represent the logical absence of a value. If a thread detects a tombstone value in a given slot, the thread can treat the slot as empty. Initializing to tombstone values can be beneficial because when a hashed value is added to a mapping entry, that mapping entry becomes immediately visible to threads attempting to do a lookup. If the slots are not initialized to tombstone values, another thread may attempt to lookup the location after the hashed value is written but before the location is written. If the locations are not initialized to tombstone values, the thread performing the lookup may load whatever data happens to be in the unwritten location slot, which can cause errors. By contrast, if the thread performing the lookup determines that the location is a tombstone value, the thread can determine that there is not actually a valid value in the location.

In some initialization operations, it can be known or predetermined that the data that will be used will be frequently updated. In such situations, the initialization instructions 310 can provide for the addition of padding during allocation to allow the hash table 200 to be friendlier to the potential access pattern. However, the addition of padding can come as a tradeoff, such as by increasing the memory footprint of the hash table 200 and adding pressure to the caching system and the prefetch system.

Insert Instructions

Figure 5:
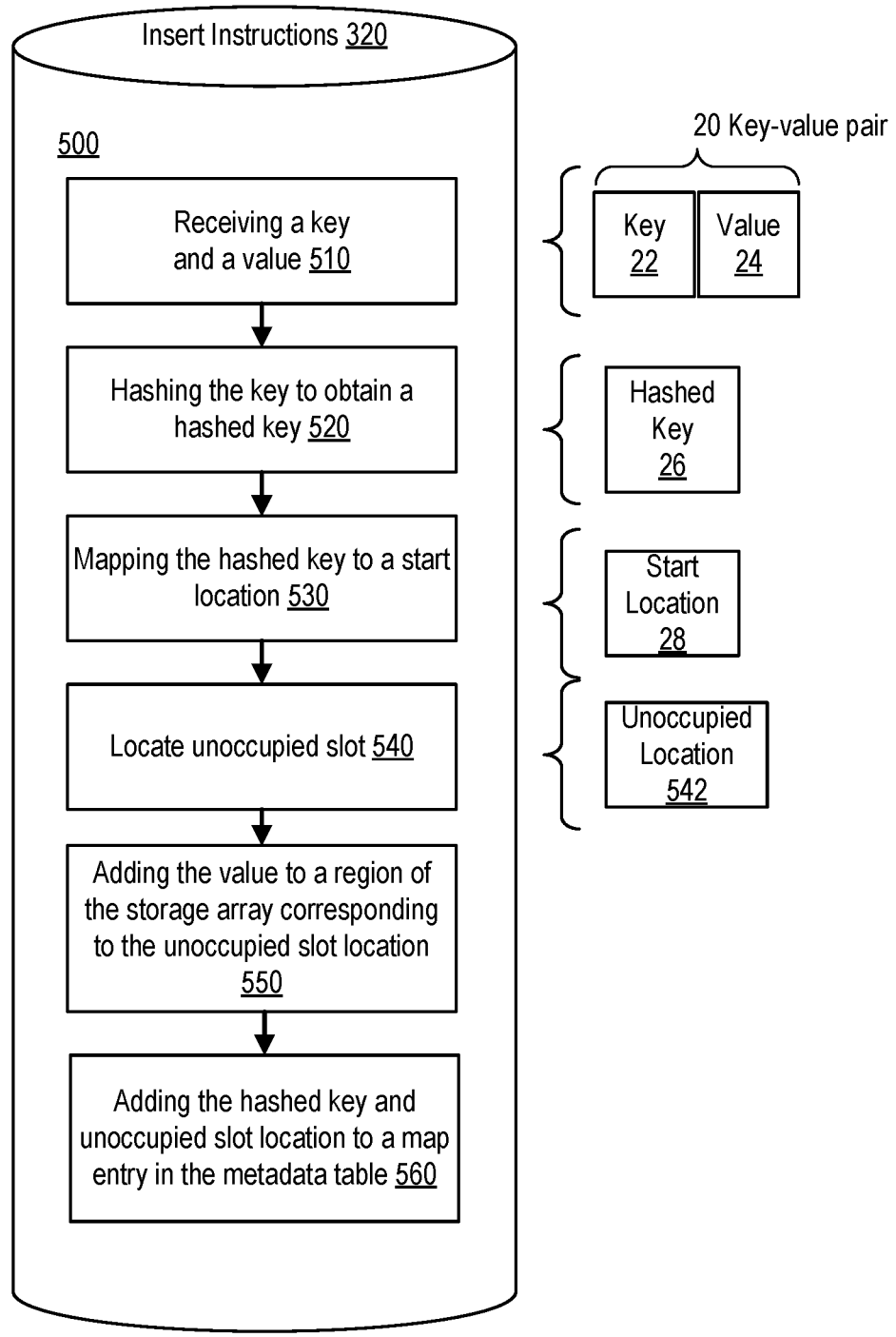
FIG. 5 illustrates insert instructions and insert operations.

FIG. 5 illustrates insert instructions 320 and an insert process 500. The insert process 500 can be used to add a key-value pair 20 to the hash table 200. Where the key 22 of the key-value pair 20 already exists in the hash table, the value 24 stored in the storage array 230 associated with a hash of the key 22 is updated to be the value 24 of the key-value pair 20. Where the key 22 of the key-value pair 20 does not already exist in the hash table 200, the value 24 is added to a location in the storage array 230 based on the hashed key 26 produced by hashing the key 22 with the hash function 30 associated with the hash table 200. The process 500 can begin with operation 510.

Operation 510 includes receiving a key 22 and a value 24. In some examples, the key 22 and the value 24 are received as a key-value pair 20. In some examples, the hash table 200 or an associated library can expose a callable function that allows for a thread to provide a key 22 and a value 24 to be inserted into the hash table 200. Following operation 510, the flow of the process 500 can move to operation 520.

Operation 520 includes hashing the key 22 to obtain a hashed key 26. In an example, the operation 520 includes calling the hash function 30 associated with the hash table 200 with the key 22 as input to obtain the hashed key 26 as output. In many examples, the resulting hashed key 26 is a number, such as an integer. The qualities of the hashed key 26 can vary depending on the kind of hash function 30 used. Following operation 520, the flow can move to operation 530.

Operation 530 includes mapping the hashed key 26 to a start location 28. In an example, operation 530 includes calling the mapping function 40 or executing one or more lines of code that perform a mapping using the hashed key 26 as input. In many examples, the hash table size 201 is used during the mapping process. As described above in relation to FIG. 1, the mapping can include converting the hashed key 26 into a valid location in the hash table 200 based on the hash table size 201. In an example, the mapping includes performing h modulo n, where h is the hashed key 26 and n is the hash table size 201. In an example where n is a power of two, the mapping includes evaluating the equation h & (n−1), where "&" is the bitwise AND operation, h is the hashed key 26, and n is the hash table size 201. The result of the mapping is the start location 28. Following operation 530, the flow can move to operation 540.

Operation 540 includes locating an unoccupied location 542 in the hash table 200. The unoccupied location 542 can be an unoccupied slot of the hash table 200.

In many examples, the locating of the unoccupied location 542 is based on the start location 28. For instance, the operation 540 can include determining whether a bit in the storage bitmap 210 corresponding to the start location 28 indicates that the storage array 230 slot corresponding to the start location 28 is available. This operation 540 can include checking the ith bit of the storage bitmap 210 to determine whether the value is one or zero, where i is a number corresponding to the start location 28 (e.g., where the start location 28 is one, i is one). If the value indicates that the slot is available (e.g., a value of one can indicate that the slot is available and a value of zero can indicate that the slot is unavailable), then the unoccupied location 542 is determined to be the same as the start location 28. If the value indicates that the slot is unavailable, then additional slots are probed until an available slot is determined. Once an available slot is reached, the unoccupied location 542 can be determined to be the location of the available slot.

In some examples, the locating of the unoccupied location 542 is not based on the start location 28. For instance, the operation 540 can include determining whether the first bit in the storage bitmap 210 (e.g., the zeroth bit if the storage bitmap 210 is indexed from zero or the first bit if the storage bitmap 210 is indexed from one) indicates that the storage array 230 slot corresponding to the first bit is available. This operation 540 can include checking the value of the first bit of the storage bitmap 210 to determine whether the value is one or zero. If the value indicates that the slot is available (e.g., a value of one can indicate that the slot is unavailable and a value of zero can indicate that the slot is available), then the unoccupied location 542 is determined to be a location associated with that bit. If the value indicates that the slot is unavailable, then additional slots are probed. The unoccupied location 542 can be determined to be the available slot.

Probing for additional slots can be performed using any of a variety of techniques. In many examples herein, linear probing is advantageous to allow for speed increases due to prefetching. Linear probing includes checking the next location to determine whether it is available. For example, in many implementations linear probing checks the next slot (e.g., an adjacent slot) by adding one to the current location (e.g., where the current slot is the first slot, linear probing would include checking the second slot, then the third slot, and so on until an available slot is located or all slots have been checked). Other techniques can also be used, such as quadratic probing.

Using the start location 28 (which is based on the hashed key 26) as the basis for where to start looking for an unoccupied location 542 is advantageous by avoiding clustering in the storage bitmap 210. Starting the search for an unoccupied location 542 at the beginning of the storage bitmap, can result in clustering of occupied and unoccupied location 542, which can be slow due to the need to probe several successive bits to find an unoccupied location 542. By contrast, beginning the search from the start location 28 allows for relatively even spread of allocation across the storage bitmap 210, which makes it easier to locate unoccupied locations 542 and keeps toward as constant time as possible.

Once the unoccupied location 542 is located, the storage bitmap 210 can be updated to reflect that the unoccupied location 542 will become occupied. In an example, the updating is performed as an atomic operation. Advantageously, performing the updating as an atomic operation can allow a calling thread to perform atomic swapping of values into the hash table 200. In particular, configurations of hash tables 200 disclosed herein can allow for the generalization of compare and swap with arbitrarily sized data. For example, a thread can compare-and-swap a key, and the hash table 200 is able to guarantee that that thread is the only thread that obtained that data. This feature is useful for various workloads. Further, this can guarantee that the calling thread that obtained the slot in the storage array 230 is the only thread that has write access to the location in the storage array 230. As can be seen from the above, the process of adding a value to the hash table 200 can be performed without relying on a memory manager outside of the initialization instructions (e.g., relying on an operating system level memory manager). This can be because the memory for the storage array 230 was already allocated during, for example, the initialization process 400. During the identification of available or unavailable slots (which can be analogous to identifying allocated and unallocated memory locations), the storage bitmap 210 is used and such a process can act as an actual or pseudo memory manager without needing to rely on another memory manager (e.g., without relying on an operating system level memory manager). Thus, the insert key-value pair operations use the storage bitmap 210 to identify available memory locations in the storage array 230 of the hash table 200. Following operation 540, the flow can move to operation 550.

Operation 550 includes adding the value 24 to a region of the storage array 230 corresponding to the unoccupied location 542. Following operation 550, the flow can move to operation 560.

Operation 560 includes adding the hashed key 26 and the unoccupied slot location to the metadata table 220. This operation 560 can include probing for a slot belonging to, or available for, the hashed key 26. The probing can begin at the start location 28 (even if the allocated slot is different from the start location 28). If the probed location is unoccupied, then the thread attempts to put (e.g., using a compare-and-swap operation) the hashed key 26 into the portion of the metadata table corresponding to hashed keys 26 and then attempts to put (e.g., using a compare-and-swap operation) the storage index corresponding to the stored value into the metadata table 220. If the probed location already has the hashed key 26 in the location (i.e., the hashed key 26 already exists in the metadata table), then the thread attempts to put (e.g., using a compare-and-swap operation) the storage location (e.g., data corresponding to the unoccupied location 542) into the metadata table, thereby finishing the insertion. If the thread makes it the entire way around the table without locating a slot that is either unoccupied or already has the hashed key 26, then the thread deallocates the value from the storage array 230 (e.g., by marking the corresponding location in the storage bitmap 210 as empty and, in some implementations, zeroing out the slot in the storage array 230) and returns failure to the code that requested insertion.

Lookup Instructions

Figure 6:
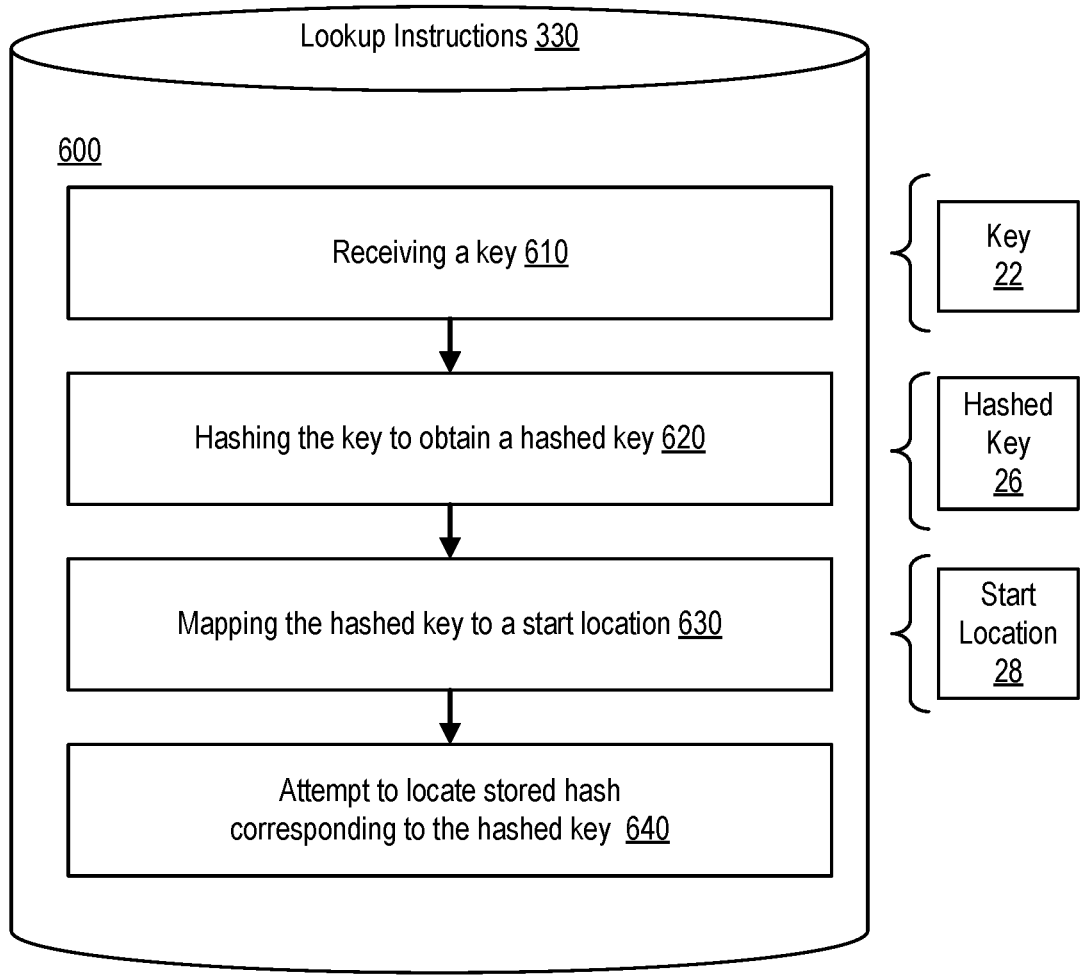
FIG. 6 illustrates lookup instructions and lookup operations.

FIG. 6 illustrates lookup instructions 330 and a lookup process 600. The lookup process 600 can be used to look up a value 24 in the hash table 200 corresponding to a given key 22. The process 600 can begin with operation 610.

Operation 610 includes receiving a key 22. In some examples, the hash table 200 or an associated library can expose a callable function that allows for a thread to receive a key 22 to be looked up in the hash table 200. Following operation 610, the flow of the process 600 can move to operation 620.

Operation 620 includes hashing the key 22 to obtain a hashed key 26. Operation 620 can be as described in operation 520. Following operation 620, the flow can move to operation 630.

Operation 630 includes mapping the hashed key 26 to a start location 28. This operation can be as described in operation 530. Following operation 630, the flow can move to operation 640.

Operation 640 includes attempting to locate a stored hash corresponding to the hashed key 26. This operation 640 can include probing for a slot having a hashed key 26 corresponding to the hashed key 26. The probing can begin at the start location 28. If the probed location is unoccupied or includes a hashed key 26 that does not correspond to the received hashed key 26, then the probing continues. If the probed location has the hashed key 26 in the location, then the storage location of the mapping entry 222 having the hashed key 26 is obtained. Then the value 24 stored in the storage array 230 via the storage location is obtained and returned to the calling thread. If the thread makes it the entire way around the metadata table 220, then the operation returns failure indicating that the provided key 22 is not within the hash table 200.

Computing System

Figure 7:
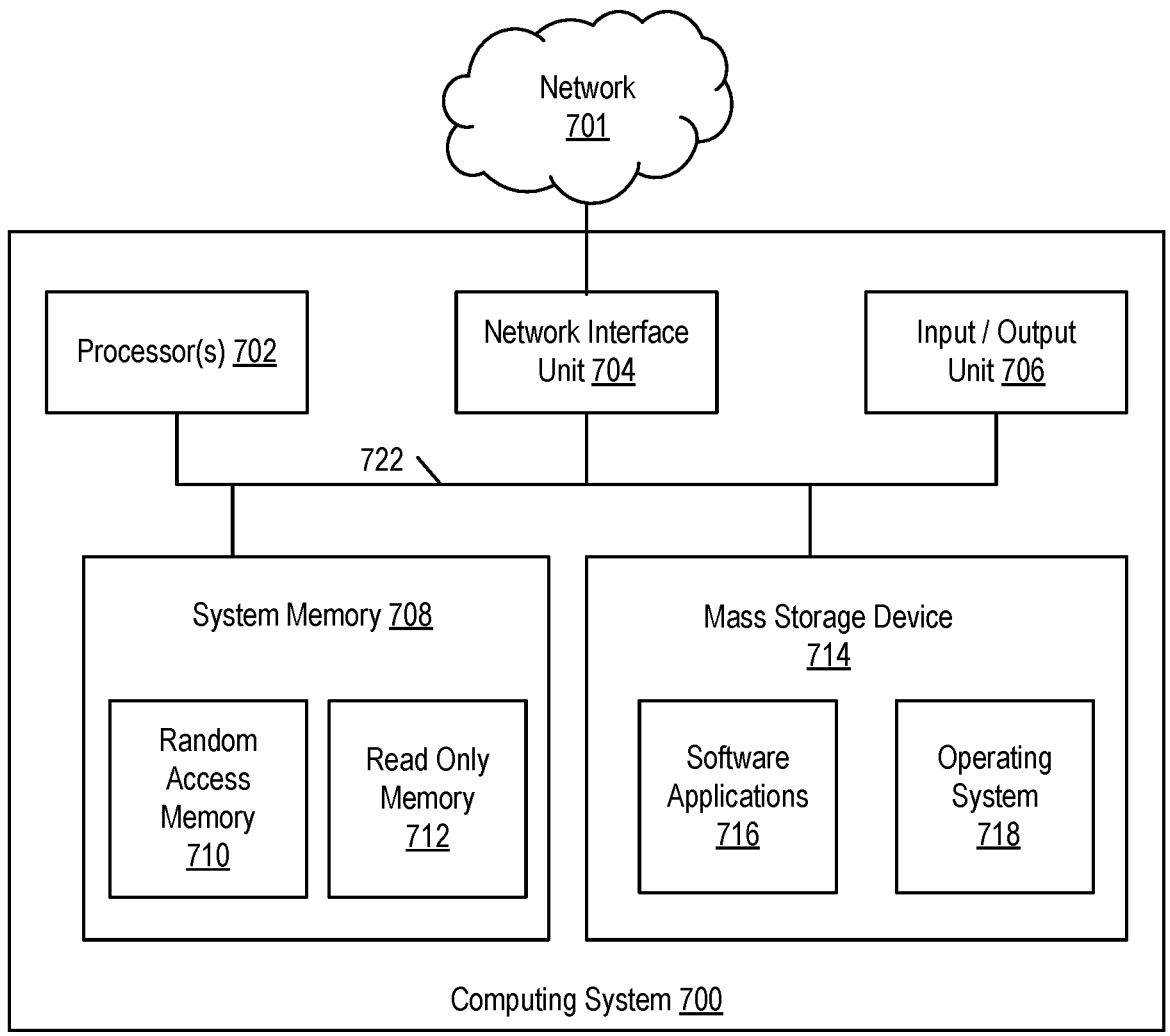
FIG. 7 illustrates an example block diagram of a computing system.

FIG. 7 illustrates an example block diagram of a virtual or physical computing system 700. One or more aspects of the computing system 700 can be used to implement the hash table 200, store instructions described herein, and preform operations described herein.

In the embodiment shown, the computing system 700 includes one or more processors 702, a system memory 708, and a system bus 722 that couples the system memory 708 to the one or more processors 702. The system memory 708 includes RAM (Random Access Memory) 710 and ROM (Read-Only Memory) 712. A basic input/output system that contains the basic routines that help to transfer information between elements within the computing system 700, such as during startup, is stored in the ROM 712. The computing system 700 further includes a mass storage device 714. The mass storage device 714 is able to store software instructions and data. The one or more processors 702 can be one or more central processing units or other processors.

The mass storage device 714 is connected to the one or more processors 702 through a mass storage controller (not shown) connected to the system bus 722. The mass storage device 714 and its associated computer-readable data storage media provide non-volatile, non-transitory storage for the computing system 700. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 700.

According to various embodiments of the invention, the computing system 700 may operate in a networked environment using logical connections to remote network devices through the network 701. The network 701 is a computer network, such as an enterprise intranet and/or the Internet. The network 701 can include a LAN, a Wide Area Network (WAN), the Internet, wireless transmission mediums, wired transmission mediums, other networks, and combinations thereof. The computing system 700 may connect to the network 701 through a network interface unit 704 connected to the system bus 722. It should be appreciated that the network interface unit 704 may also be utilized to connect to other types of networks and remote computing systems. The computing system 700 also includes an input/output controller 706 for receiving and processing input from a number of other devices, including a touch user interface display screen, or another type of input device. Similarly, the input/output controller 706 may provide output to a touch user interface display screen or other type of output device.

As mentioned briefly above, the mass storage device 714 and the RAM 710 of the computing system 700 can store software instructions and data. The software instructions include an operating system 718 suitable for controlling the operation of the computing system 700. The mass storage device 714 and/or the RAM 710 also store software instructions, that when executed by the one or more processors 702, cause one or more of the systems, devices, or components described herein to provide functionality described herein. For example, the mass storage device 714 and/or the RAM 710 can store software instructions that, when executed by the one or more processors 702, cause the computing system 700 to receive and execute managing network access control and build system processes.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of hash tables, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A system comprising:
   one or more processors; and
   a non-transitory computer-readable medium comprising instructions that, when executed by one or more processors, cause the one or more processors to:
   maintain in memory a data structure comprising:
      a storage array;
      a storage bitmap encoding memory availability information for the storage array; and
      a metadata table for storing mapping entries, wherein the mapping entries comprise:
         a first mapping entry that maps from a first hashed key to an occupied index in the storage array storing a first value associated with the first hashed key; and
         a second mapping entry that maps from a second hashed key to a tombstone value; and
   receive and store a value in the storage array based on an associated key using the storage bitmap and the metadata table, including:
      receiving the associated key and value;
      hashing the key to obtain a hashed key;
      mapping the hashed key to a start location;
      locating an unoccupied location in the storage array by starting at the start location and performing a probe of the storage bitmap for a next location that is unoccupied; and
      storing the value to a slot of the storage array corresponding to the unoccupied location; and
   lookup and return a value stored in the storage array based on an associated key using the storage bitmap and the metadata table.

2. The system of claim 1, wherein receiving and storing the value in the storage array includes:
   receiving the associated key and the value;
   hashing the key to obtain a hashed key;
   mapping the hashed key to a start location;
   locating an unoccupied location in the storage array based on the start location and using the storage bitmap; and
   storing the value to a slot of the storage array corresponding to the unoccupied location.

3. The system of claim 1, wherein locating the unoccupied location includes:
   determining whether a bit of the storage bitmap corresponds to the start location indicates that a slot of the storage array at the start location in the storage array is available.

4. The system of claim 1, wherein locating the unoccupied location includes:

performing linear probing of bits in the storage bitmap starting at the start location.

5. The system of claim 1, wherein the hashed key is a number.

6. The system of claim 5, wherein mapping the hashed key to the start location includes:
performing h modulo n, where h is the hashed key and n is a number of slots in the storage array.

7. The system of claim 1, wherein the data structure is a hash table.

8. The system of claim 1, wherein maintaining in the memory includes contiguously maintaining the storage array, the storage bitmap, and the metadata table in shared memory.

9. The system of claim 1, wherein the storage array, the storage bitmap, and the metadata table have a fixed size.

10. The system of claim 1, wherein the instructions when executed by the one or more processors further cause the one or more processors to:
initialize the data structure by contiguously creating the storage bitmap, the metadata table, and the storage array as fixed-size memory regions in memory.

\* \* \* \* \*